United States Patent
McGuinness

[19]

[11] Patent Number: 6,082,039
[45] Date of Patent: Jul. 4, 2000

[54] FISHING LURE HAVING ARTICULATABLE HOOK CONNECTOR

[76] Inventor: Justin A. McGuinness, 475 Baldwin St., #53, Athens, Ga. 30605

[21] Appl. No.: 09/018,906

[22] Filed: Feb. 5, 1998

[51] Int. Cl.⁷ .......................... A01K 85/00; A01K 69/00
[52] U.S. Cl. ...................... 43/42.53; 43/4.5; 43/42.13; 43/42.11
[58] Field of Search .................. 43/42.13, 42.11, 43/42.53, 4.5

[56] References Cited

U.S. PATENT DOCUMENTS

| | | | |
|---|---|---|---|
| Re. 35,160 | 2/1996 | Nichols | 43/42.53 |
| 1,388,156 | 8/1921 | Allen | 43/42.13 |
| 1,547,619 | 7/1925 | Shannon | 43/42.13 |
| 1,701,444 | 2/1929 | Darr | 43/42.53 |
| 2,496,927 | 2/1950 | Witte | 43/42.53 |
| 2,532,961 | 12/1950 | Steen | 43/42.13 |
| 2,575,248 | 11/1951 | Clark | 43/42.53 |
| 2,955,380 | 10/1960 | Hulick | 43/42.53 |
| 3,397,478 | 8/1968 | Lowes, Jr. . | |
| 3,696,547 | 10/1972 | Cauguis . | |
| 3,848,354 | 11/1974 | Austad et al. | 43/42.49 |
| 4,011,681 | 3/1977 | Johnson | 43/42.11 |
| 4,033,065 | 7/1977 | Shannon | 43/42.13 |
| 4,149,335 | 4/1979 | Duescher | 43/42.53 |
| 4,428,144 | 1/1984 | Dickinson | 43/44.96 |
| 4,536,986 | 8/1985 | Stout | 43/42.27 |
| 4,559,736 | 12/1985 | Sienkiewicz | 43/42.25 |
| 4,671,007 | 6/1987 | Stanczyk | 43/42.53 |
| 4,738,047 | 4/1988 | Ryan | 43/42.25 |
| 4,793,089 | 12/1988 | Long et al. . | |
| 4,823,501 | 4/1989 | Standish, Jr. . | |
| 4,850,131 | 7/1989 | Standish, Jr. | 43/42.53 |
| 4,884,358 | 12/1989 | Grove et al. | 43/42.13 |
| 4,901,470 | 2/1990 | Gentry | 43/42.13 |
| 4,947,574 | 8/1990 | Tapley | 43/36 |
| 5,024,019 | 6/1991 | Rust et al. . | |
| 5,050,334 | 9/1991 | Standish, Jr. . | |
| 5,081,786 | 1/1992 | Cobb | 43/44.89 |
| 5,182,876 | 2/1993 | Lewis . | |
| 5,201,784 | 4/1993 | McWilliams . | |
| 5,321,905 | 6/1994 | Higgins | 43/42.03 |
| 5,400,542 | 3/1995 | Johnson | 343/42.06 |
| 5,497,581 | 3/1996 | Williams . | |
| 5,499,470 | 3/1996 | Reed . | |
| 5,519,960 | 5/1996 | Cular . | |
| 5,566,497 | 10/1996 | Oesterreich . | |
| 5,634,290 | 6/1997 | Johnson | 43/42.19 |
| 5,647,163 | 7/1997 | Gorney | 43/42.13 |

FOREIGN PATENT DOCUMENTS

| | | | |
|---|---|---|---|
| 594616 | 3/1960 | Canada | 43/42.13 |
| 640556 | 7/1950 | United Kingdom | 43/42.53 |
| 685135 | 12/1952 | United Kingdom | 43/42.53 |

OTHER PUBLICATIONS

Publisher–Bassmaster Magazine, advertisement entitled "A Bait That Bites Back" shown on p. 93 in the Dec. 1997 issue (vol. 30, No. 10).

Merriam Webster's Dictionary, Tenth edition, p. 158, Jan. 1996.

"The Dragnetter", Advertisement, Field and Stream, p. 109, May 1955.

"Ledge Hopper", Bass Plug Hot Rods, Field and Stream, pp. 52–55, Aug. 1955.

*Primary Examiner*—Michael J. Carone
*Assistant Examiner*—Fredrick T. French, III
*Attorney, Agent, or Firm*—Nixon & Peabody LLP

[57] ABSTRACT

A fishing lure (10) having an articulatable hook connector (24) well suited for use with either spinner or buzz baits. The fishing lure has a head (12), a shaft (14) extending from the head to engage a fishing line (16), a hook (26) and a resilient, yet articulable hook connector anchored within the head operably connecting the hook to the head. To anchor the hook connector, a loop is formed at the one end to receive and engage a curved end (28) of the shaft to form a first connection (30), and the first connection is secured by forming the head around the first connection. The hook is mounted to the hook connector by attaching the hook connector to the hook's shank (36) with either a wrapping wire or a clamp to form a second connection (34) and placing solder over the second connection. A fold is formed on the second connection and the fold is soldered thereto.

12 Claims, 3 Drawing Sheets

FISHING LURE HAVING ARTICULATABLE HOOK CONNECTOR

BACKGROUND OF THE INVENTION

I. Field of the Invention

The present invention relates generally to the field of artificial bait for fishing. More particularly, the present invention relates to a fishing lure having an articulatable hook connector disposed between a head and a hook.

II. Description of the Related Art

Anglers often utilize fishing lures capable of attracting fish by the use of a rotating member which produces sounds, splashing or vibrational effects. Typically, these lures have a hook which is either rigidly mounted or articulately mounted to a head. When the hook rigidly extends from the head, particularly with those lures having a skirt, the lure can be weedless. That is, the hook is capable of resisting entanglement with either land or water plants. When fish are less aggressive and not attacking the lure, anglers sometimes removably attach a trailer hook to the hook to improve the lure's effectiveness. Unfortunately, the trailer hook has unrestricted articulated movement and are therefore non-weedless.

Examples of lures having hooks which are articulately mounted to the heads are described in U.S. patents issued to Cauquis (U.S. Pat. No. 3,696,547), Long et al. (U.S. Pat. No. 4,793,089), Lewis (U.S. Pat. No. 5,182,876) and Oesterreich (U.S. Pat. No. 5,566,497). Articulately mounted hooks offer the angler superior recovery percentages because the fish, once hooked, can not easily throw the hook by its resistive movements. The hook moves as the fish moves with respect to the head, thereby preventing the fish from gaining leverage against the head, tearing a larger hook penetration opening and slipping off the hook. Unfortunately, because these lures have hooks with unrestrictive articulated movement, the lures are non-weedless.

Snap-Set Lures advertises a fishing lure under the brand name SNAP-SET SPINNERBAIT. This lure is a spinnerbait that has a hook flexibly attached to a frame by what is described as a heavy braid. The braid is slid into a rubber sheath at the base of a head. When the fish strikes the bait, the braid is pulled from the sheath and provides more play for the fish, thereby providing less leverage to the fish. Once the hook encounters resistance of any kind, the braid extends from the sheath, making the lure non-weedless.

SUMMARY OF THE INVENTION

In accordance with the present invention and the contemplated problems which have and continue to exist in this field, one of the objectives of this invention is to provide a fishing lure having an articulatable hook connector which is weedless.

It is another object of the present invention to provide a resilient hook connector that flexes as a fish, which is caught on a hook of the fishing lure, attempts to shake the hook from its mouth, thereby preventing the fish from gaining leverage.

Yet, it is another object of the present invention to provide a hook connector comprising a resilient twisted or braided cable having a plurality of stainless steel filaments.

Still, it is another object of the present invention to provide a method of manufacturing a fishing lure having an articulatable hook connector.

This invention accomplishes the above and other objectives and overcomes the disadvantages of the prior art by providing a fishing lure having an articulatable hook connector that is simple in design and construction, inexpensive to fabricate, and easy to use. It is particularly well suited for use with either spinner or buzz baits. The fishing lure has a head, a shaft extending from the head to engage a fishing line, a hook and a resilient, yet articulable hook connector anchored within the head at one end and mounted to the hook at the other end. To anchor the hook connector, a loop is formed at the one end to receive and engage a curved end of the shaft to form a first connection, and the first connection is secured by forming the head around the first connection. The other end of the hook connector is mounted to the hook by attaching the hook connector to a shank portion with either a wrapping wire or a clamp to form a second connection and placing solder over the second connection. The hook connector comprises a stainless steel, heat treated and kink resistant trolling cable comprising a plurality of either spiral wound or braided filaments. Since the hook connector is capable of extending the hook away from the body, the need for a trailer hook, also called a stinger hook, attached to the hook is eliminated. Additionally, due to the resilience of the hook connector, the hook does not have free range of motion like prior art lures having hooks articulatably mounted to the head, thereby enabling the fishing lure to be weedless.

It is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Other objects, advantages and capabilities of the invention will become apparent from the following description taken in conjunction with the accompanying drawings showing preferred embodiments of the invention.

BRIEF DESCRIPTION OF THE DRAWINGS

The invention will be better understood and the above objects as well as objects other than those set forth above will become apparent when consideration is given to the following detailed description thereof. Such description makes reference to the annexed drawings wherein.

Figure 1:
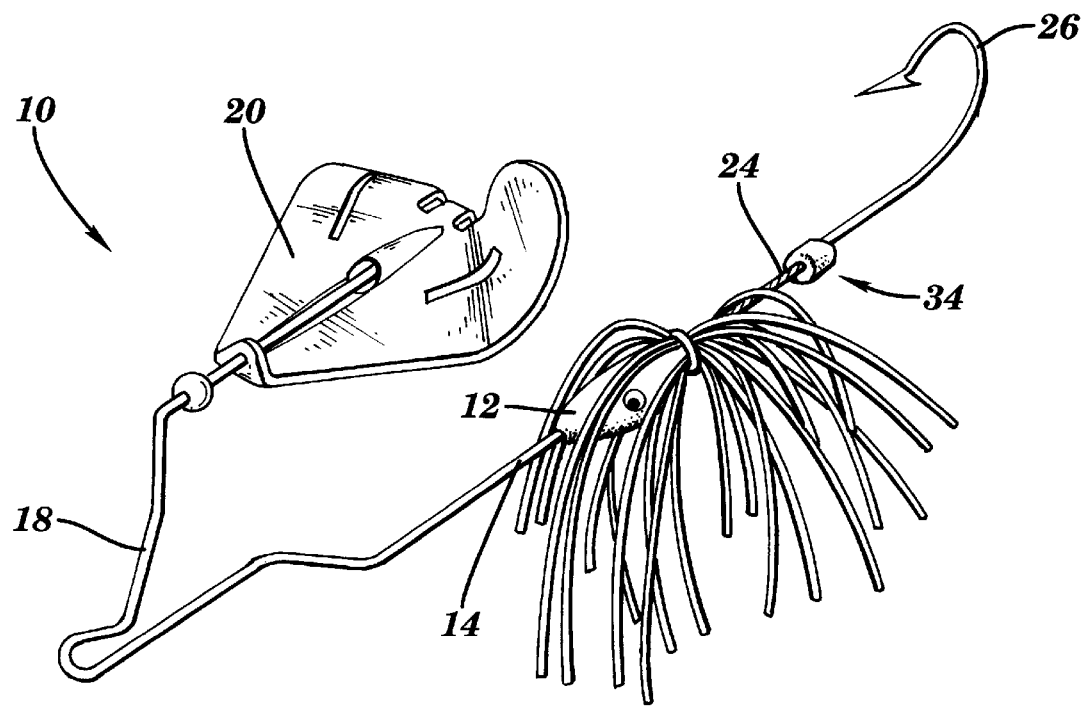
FIG. 1 is a perspective view of a fishing lure having an articulated hook connector made in accordance with the present invention.

The reference numbers in the drawings relate to the following:

10=fishing lure
12=head
14=shaft

16=fishing line
18=frame
20=blade
22=fish
24=hook connector
26=hook
28=curved end of shaft
30=first connection
32=clamp
34=second connection
36=shank of hook

DESCRIPTION OF THE PREFERRED EMBODIMENTS

For a fuller understanding of the nature and desired objects of this invention, reference should be made to the following detailed description taken in connection with the accompanying drawings. Referring to the drawings wherein like reference numerals designate corresponding parts throughout the several figures, reference is made first to FIG. 1. FIG. 1 of the drawings is a perspective view illustrating a fishing lure 10 made in accordance with the present invention.

Figure 2:
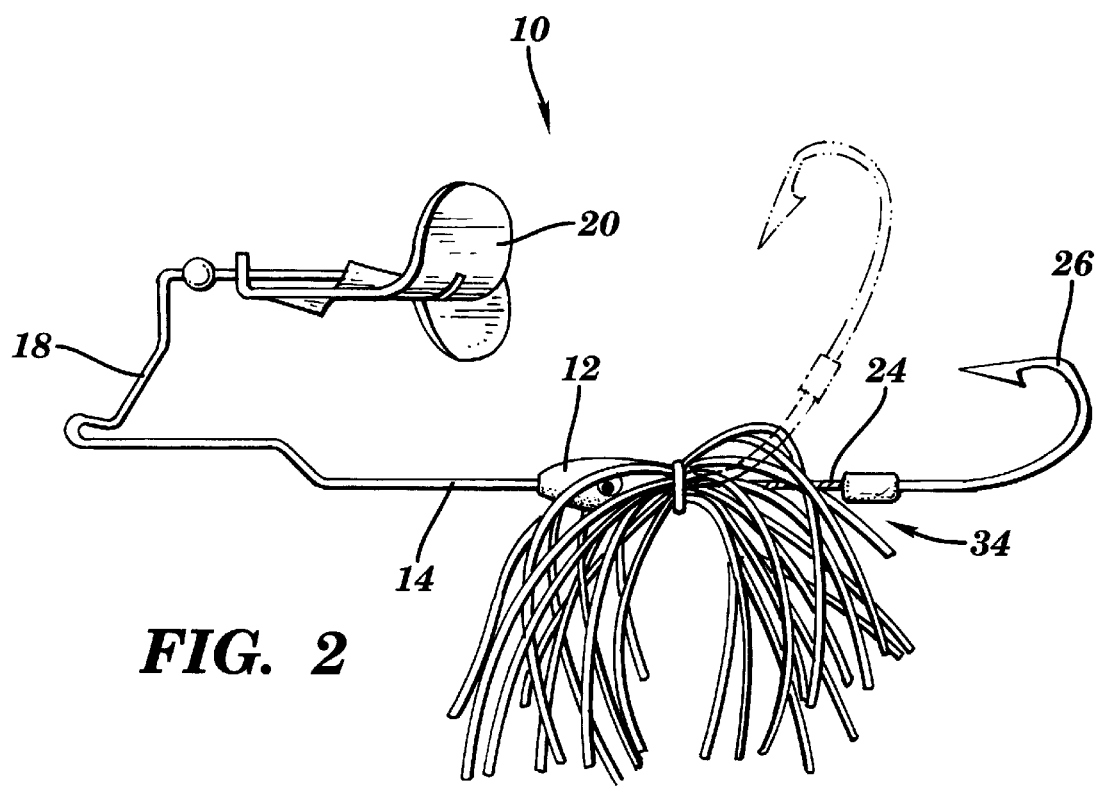
FIG. 2 is a side elevation view of the fishing lure of FIG. 1 indicating articulated motion of the hook connector.

With additional reference to FIG. 2, the fishing lure has a head 12, a shaft 14 extending from the head 12 which is capable of engaging a fishing line 16. Additionally, the shaft 14 can connect to a frame 18 having other apparatus, such as a spinner (not shown) or a blade 20, which are utilized to attract fish 22. Anchored within the head 12 is an articulable hook connector 24. A hook 26 is mounted to the hook connector 24 at the end opposite the head 12.

Figure 4:
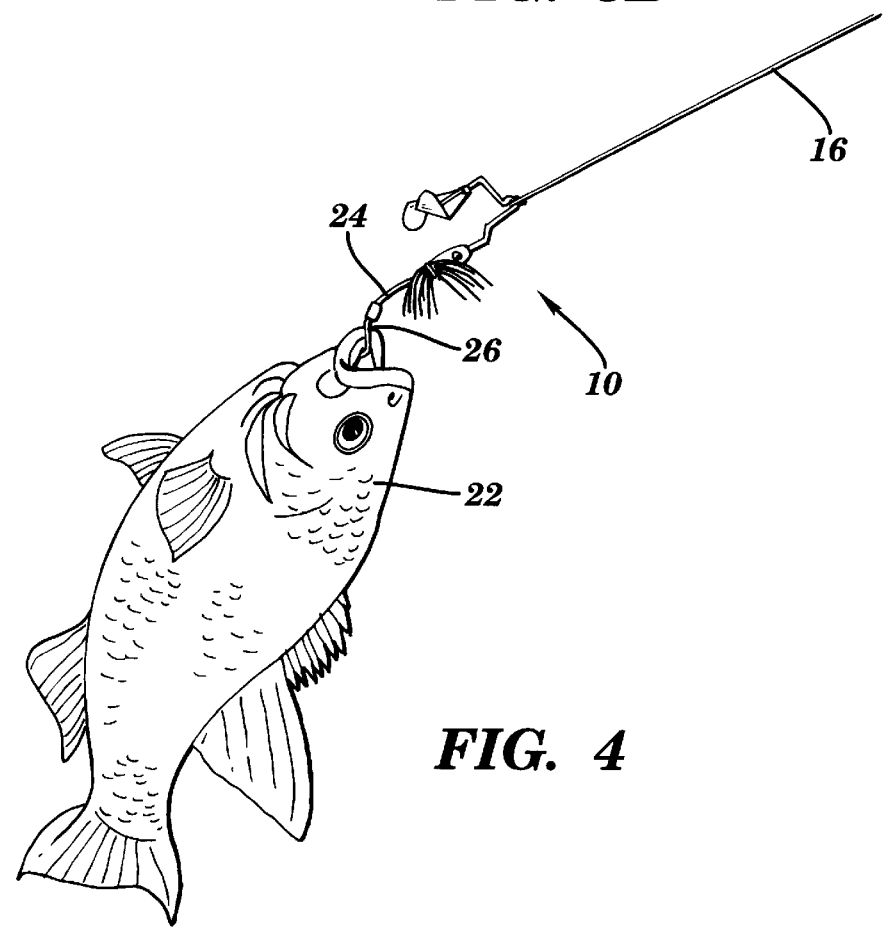
FIG. 4 is a perspective view of the fishing lure with the hook connector being articulated by a fish caught on the hook.

The hook connector 24 enables the hook 26 to resiliently extend outwardly and away from the head 12. Because the hook connector 24 is resilient, the fishing lure 10 is weedless. However, as shown in FIG. 4, as the "caught" fish 22 attempts to shake the hook 26 from its mouth, the hook connector 24 flexes and prevents the fish 22 from gaining leverage with respect to the head 12.

Figure 3A:
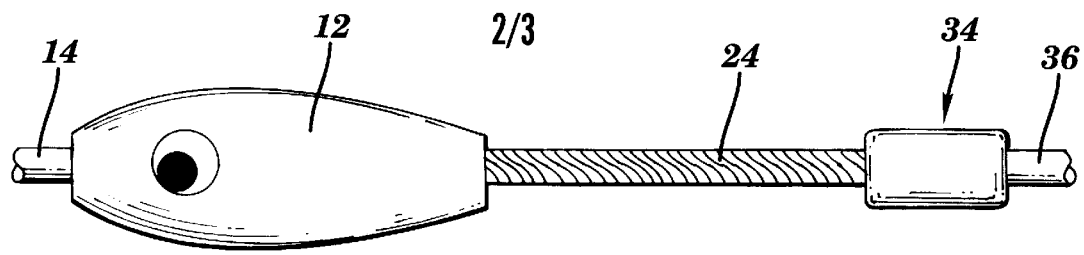
FIG. 3A is a partial side view of one embodiment of the hook connector.
Figure 3B:
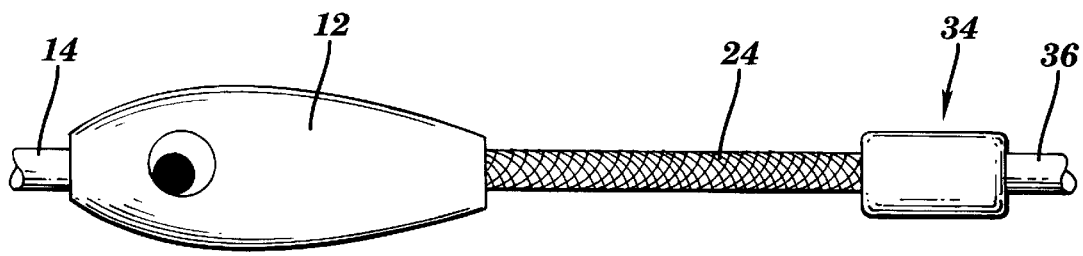
FIG. 3B is a partial side view of another embodiment of the hook connector.

Referring to FIGS. 3A and 3B, the hook connector 24 comprises a kink resistant cable having a plurality of filaments. As shown in FIG. 3A, one embodiment of the hook connector 24 has the filaments spiral wound. In the embodiment shown in FIG. 3B, the hook connector 24 has the filaments braided. An acceptable material which can be utilized for the hook connector 24 is distributed by Mason Tackle Co. under the trade name MASON "49" STRAND TROLLING CABLE. This cable utilizes 49 filaments of 7×7 construction stainless steel and is heat treated. Another acceptable material which can be utilized for the hook connector 24 is distributed by Sevenstrand Tackle Corp. under the trade name DURATEST "49-275A". This cable also has 49 filaments made of stainless steel and is rated at 275 pounds test strength. Preferably, the hook connector 24 has 275 pounds test strength and is 0.045 inch in diameter. The hook connector 24 keeps the hook directly behind the head 12 as the fishing lure 10 is being pulled through the water, thereby preventing it from snagging plants or debris. Further, the hook connector 24 increases the distance between the body 12 and the hook 26 and eliminates the need for a trailer hook, most useful for short biting fish 22.

Figure 5:
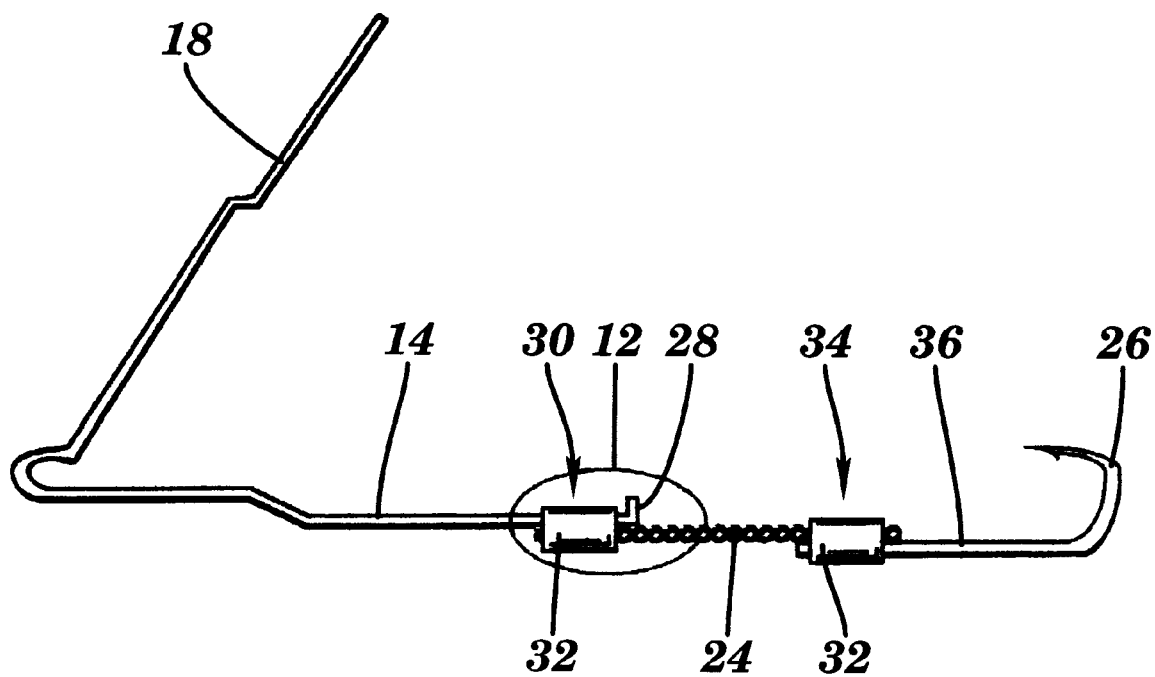
FIG. 5 is a partial side view of the fishing lure showing a first and second connection.

Now referring to FIG. 5, the hook connector 24 is anchored within the head 12 by forming a loop at one end of the hook connector 24 to receive and engage a curved end 28 of the shaft 14, inserting the curved end 28 of the shaft 14 into the loop to form a first connection 30, and securing and encasing the first connection 30 by forming the head 12 around the first connection 30. Preferably, the first connection 30 is placed into a mold (not shown) for the head 12 and molten lead is poured into the mold, thereby encasing the first connection 30 within the head 12. The loop can be formed by either wrapping a wire (not shown), preferably copper wire, around the one end in contact with the hook connector 24. Also, the loop can be formed by clamping the one end in contact with the hook connector 24, preferably with the curved end 28 of the shaft 14 disposed within the loop, by a clamp 32. The other end of the hook connector 24 is mounted to the hook 26 by forming a second connection 34, soldering the second section 34, folding another portion of the hook connector 24 over the second connection 34 to form a fold, and soldering the fold. The hook connector 24 can be attached to a shank 36 of the hook 26 to form the second connection 34 by either wrapping the wire around the portion of the hook connector 24 in contact with the shank 36 or clamping the hook connector 24 to the shank 36 with another clamp 32. Although not required, the folded section of the hook connector 24 in contact with the second connection 34 can be wrapped with the wire prior to soldering the fold.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A fishing lure, comprising:

a head;

a shaft extending outwardly from the head for engaging a fishing line;

a flexible, resilient hook connector anchored to the head, the hook connector having an initial shape and comprising a kink resistant cable having a plurality of filaments wherein the filaments have a substantially same cross-sectional diameter; and a hook mounted to the hook connector for hooking an animal, whereby the hook connector returns substantially to the initial shape after being bent by the hooked animal.

2. A fishing lure as claimed in claim 1, wherein the hook connector comprises a heat treated material.

3. A fishing lure as claimed in claim 1, wherein the filaments of the hook connector are made of stainless steel.

4. A fishing lure as claimed in claim 3, wherein the filaments are spiral wound.

5. A fishing lure as claimed in claim 3, wherein the filaments are braided.

6. A method of manufacturing a fishing lure having a head, a shaft, a flexible, resilient hook connector comprising a kink resistant cable having a plurality of filaments wherein the filaments have a substantially same cross-sectional diameter, and a hook, the method comprising the steps of:

forming a loop at one end of the hook connector;

inserting the shaft into the loop to form a first connection;

securing and encasing the first connection by forming the head around the first connection;

mounting the hook to the other end of the hook connector by forming a second connection; and soldering the second connection.

7. A method as claimed as claimed in claim 6, further comprising the steps after soldering the second section:

folding a portion of the hook connector over the second connection to form a fold; and soldering the fold.

8. A method as claimed as claimed in claim 6, wherein the hook is attached to the hook connector by spiral wrapping a wire around an intersection of the hook connector and the hook.

9. A method as claimed as claimed in claim 6, wherein the hook is attached to the hook connector by clamping the hook connector to the hook with a clamp.

10. A method as claimed in claim 6, further comprising the step of securing the fold to the second section by wrapping the fold and the second connection with a wire prior to soldering the fold.

11. A method as claimed in claim 6, wherein the loop is formed by folding the hook connector proximate one end to form a folded portion, and securing the one end of the folded portion to the hook connector to form the loop.

12. A method as claimed in claim 6, wherein the loop is formed by folding the hook connector proximate one end to form a folded portion, disposing the curved end of the shaft within the folded portion, and securing the one end of the folded portion to the hook connector and the shaft to form the loop.

* * * * *